United States Patent [19]

Willey et al.

[11] Patent Number: 5,533,492
[45] Date of Patent: Jul. 9, 1996

[54] GASEOUS FUEL INJECTION CONTROL SYSTEM USING AVERAGED FUEL PRESSURE COMPENSATION

[75] Inventors: Raymond L. Willey, Redford; Ezio N. Vermiglio, Belleville, both of Mich.

[73] Assignee: Ford Motor Company, Dearborn, Mich.

[21] Appl. No.: 270,630

[22] Filed: Jul. 5, 1994

[51] Int. Cl.$^6$ .............................. F02D 41/14; F02D 41/34
[52] U.S. Cl. .......................... 123/681; 123/687; 123/488; 123/527
[58] Field of Search ...................................... 123/681, 687, 123/478, 480, 488, 527

[56] References Cited

U.S. PATENT DOCUMENTS 4,430,978  2/1984  Lewis et al. ............................. 123/478
4,493,302  1/1985  Kawamura .............................. 123/357

Primary Examiner—Andrew M. Dolinar
Attorney, Agent, or Firm—Allan J. Lippa; Roger L. May

[57] ABSTRACT

An fuel injection control system suitable for use with internal combustion vehicle engines fueled by compressed natural gas or the like. A liquid-fuel type closed-loop system, modified for gaseous fuel, establishes the duration of each injection command signal by the combination of a P.I.D. controller responsive to the level of exhaust oxygen, an adaptive table which stores previously determined fuel delivery rate values for particular engine speed and load conditions, an injector supply voltage table and an added table modifies the fuel delivery rate correction values which compensate for unwanted pressure variations which occur in the fuel supply due to injector sequencing effects, firing order, fuel flow effects, temperature effects, and fuel sensor errors.

8 Claims, 2 Drawing Sheets

5,533,492

GASEOUS FUEL INJECTION CONTROL SYSTEM USING AVERAGED FUEL PRESSURE COMPENSATION

FIELD OF THE INVENTION

This invention relates generally to methods and apparatus for controlling the delivery of pressurized gaseous fuel to an internal combustion engine including a mechanism for compensating for fuel pressure variations.

BACKGROUND OF THE INVENTION

Electronic fuel control systems are widely used in internal combustion engines to precisely meter the amount of fuel required for varying engine requirements. Such systems control the amount of fuel delivered for combustion in response to multiple system inputs including throttle angle and the concentration of oxygen in the exhaust gas produced by combustion of air and fuel. Typical electronic fuel control systems operate in a closed-loop mode in response to sensed exhaust oxygen level in order to maintain the ratio of air and fuel at or near stoichiometry. Improved forms of fuel control systems further include adaptive mechanisms which learn and remember the probable amount of fuel that needs to be injected under previously experienced engine operating conditions as specified by such sensed variables as engine speed, engine load, engine temperature, and fuel type.

When fuel control systems are designed to supply compressed gases such as natural gas, rather than gasoline and other liquid fuels, the system must also be sensitive to factors which are less consequential in liquid-fueled engines. While liquid-fuel pressure regulators are normally capable of delivering fuel at a substantially constant pressure (typically about 40 p.s.i.g.) over a wide range of operating conditions, the pressure regulators used with compressed natural gas supplied at higher pressure, typically around 100 p.s.i.g., cannot maintain constant pressure over the wide range of flow rates to which the engine is subjected. As pulses of fuel are released through the fuel injectors, pressure perturbations are induced in the fuel supply rail which are a function of numerous factors, such as engine load (typically calculated from measured air mass flow rate), engine speed, variations in the injector pulse width, regulator set point pressure, regulator and injector temperature, fuel supply tank pressure, and the design of the pressure regulator and the fuel supply rail. These pressure perturbations, measured to be as high as 6 psi, interact with the components of the fuel system to produce instabilities which cause the air/fuel mixture to deviate from its optimum level, adversely impacting engine emission levels.

SUMMARY OF THE INVENTION

In accordance with the present invention, it has been found advantageous to augment the capabilities of the electronic fuel injection control system by altering the duration of the fuel injection command signals in response to variations in a rolling average of the pressure at which fuel is supplied to the injectors, the rolling average being based on a time delay factor which is itself varied in response to the operating conditions of the engine. Varying the time delay factor in response to changing engine speed and load (air mass flow rate) as contemplated by the invention dampens pressure perturbations caused by interactions among the fuel injectors, the fuel pressure regulator, and the fuel rail, thus minimizing fluctuations in the air/fuel ratio which would otherwise deleteriously affect exhaust emission levels.

The control system contemplated by the invention includes a conventional closed-loop controller which is responsive to the sensed level of oxygen in the combustion gases generated by the engine as measured by a heated exhaust gas oxygen (HEGO) sensor. This sensor produces a rich indication when the oxygen level is low and a lean indication when the oxygen level is high. The closed-loop controller responds to each lean indication by progressively increasing the fuel delivery rate until a rich exhaust level indication is obtained. Correspondingly, the system responds to a rich indication by progressively decreasing the fuel delivery rate until a lean indication reappears.

The controller adjusts the fuel delivery rate by varying the duration of time during which the fuel injectors are open during each cycle. In accordance with the present invention, the duration of each injector command signal is adjusted by a correction value which is selected from a first lookup table consisting of a set of preset values, the particular correction value being selected from this set in accordance with two rolling averages: the average fuel pressure and the average fuel temperature, while the time delay factor used to form the rolling average of fuel pressure is itself selected from a second lookup table of preset values in accordance with signal values indicative of engine speed and engine load (air mass flow rate).

These and other features and advantages of the present invention may be better understood by considering the following detailed description of a preferred embodiment of the invention. In the course of this description, reference will frequently be made to the attached drawings.

DETAILED DESCRIPTION

Figure 1:
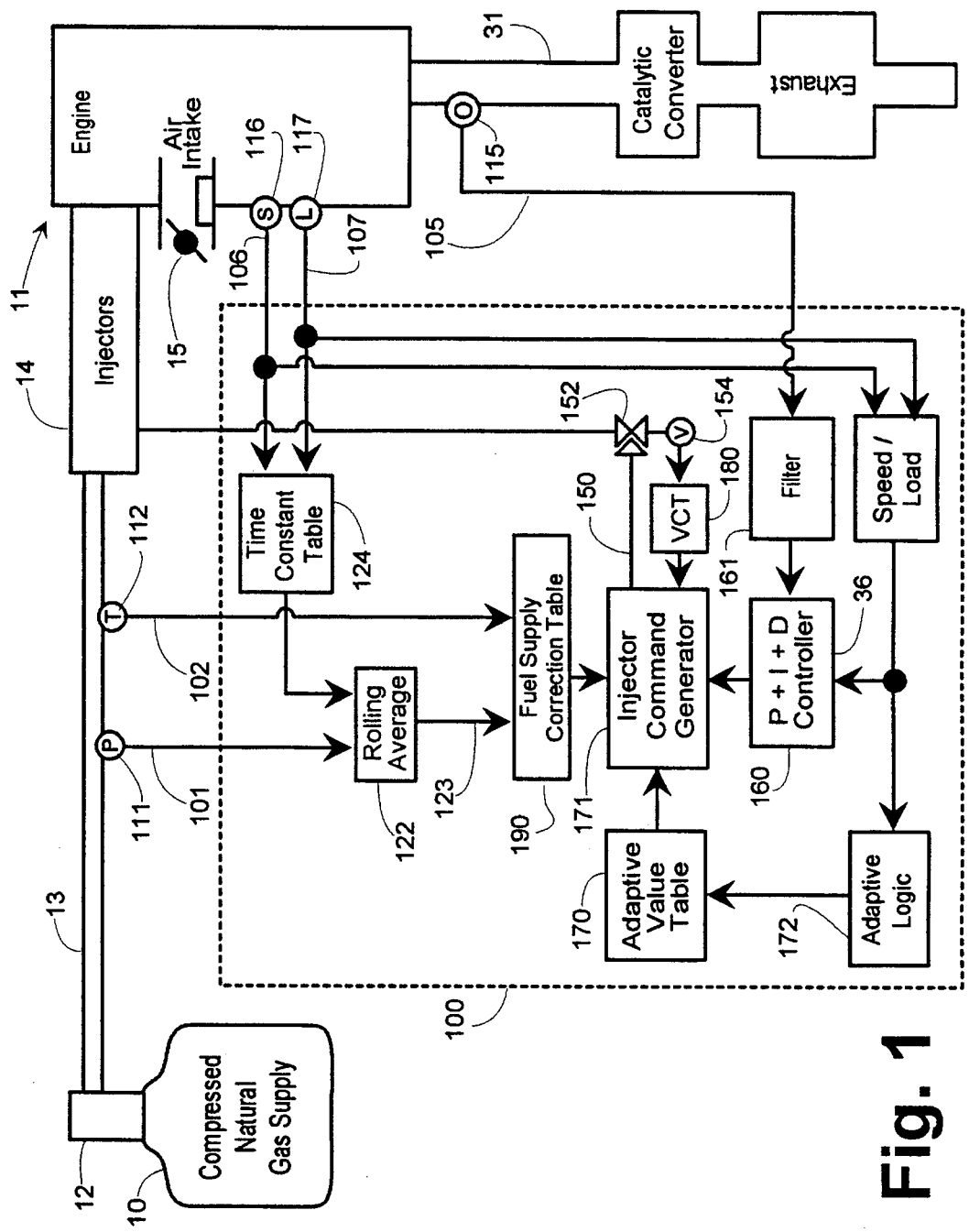
FIG. 1 of the drawings is a schematic block diagram of an internal combustion engine and an electronic engine control (EEC) system which embodies the invention.

FIG. 1 of the drawings shows a fuel control system adapted to use the principles of the invention. A fuel tank 10 containing compressed natural gas supplies fuel to an engine 11 via a pressure regulator 12 and a fuel rail 13 which extends to the conventional fuel injectors 14 of the same type used with vehicles operated on liquid fuels (gasoline, ethanol, methanol, or a mixture thereof).

A closed-loop fuel controller shown within the dashed rectangle 100 responds to signal inputs indicated at 101, 102 and 105-107 in FIG. 1. Signal input 101 provides a fuel pressure value obtained from a fuel pressure sensor 111 which measures the pressure within fuel supply conduit 13. Signal input 102 provides a fuel rail temperature value from a temperature sensor 112 in the fuel conduit 13. Sensor 112 is preferable located on the fuel rail near the injectors 14 and its output signal may be combined with the output from an engine coolant temperature (not shown) to form a value representing the estimated operating temperature within the injectors 14. Input signal 105 is obtained from a heated exhaust gas oxygen (HEGO) sensor 115 positioned to sense the level of oxygen in the gases exhausted from engine 11. Input signals 106 and 107 indicate engine speed and engine load (air mass flow rate)) respectively. The engine speed signal 106 is typically obtained by determining the pulse rate from a crankshaft tachometer 116 while the engine load value provided by signal 117 is derived from an intake manifold pressure sensor and other readings collectively represented for purposes of illustration by the sensor 117 seen in FIG. 1.

The controller 100 develops a command signal indicated at 150 in FIG. 1 which controls an electronic switch 152 which supplies an operating potential from an voltage source 154 to open and close the injectors 14. The duration of the command signals 150 controls the amount of fuel delivered to the engine. That duration is determined by an injection command generator seen at 171 in FIG. 1 which times the injector command signal duration in response to four different inputs: the output of a closed-loop proportional/integral/differential (PID) controller 160 and the output values from three correction tables: an adaptive correction value table 170, a battery voltage correction table (VCT) 180, and a fuel supply correction table 190. Each of the tables 170, 180 and 190 contains a set of predetermined values from which a particular control value is selected based on current engine operating conditions.

These control module 100 is preferably implemented by available integrated circuit microcontroller and memory devices operating under stored program control. Suitable microcontrollers for use in electronic engine control (EEC) modules are available from a variety of sources and include the members of the Motorola 6800 family of devices which are described in detail in *Motorola's Microcontroller and Microprocessor Families*, Volume 1 (1988), published by Motorola, Inc., Microcontroller Division, Oak Hill, Tex.

The fuel injection signals are timed by processing event signals from one or more sensors (as illustrated by the tachometer 116 in FIG. 1) which may be applied to the microcontroller as interrupt signals. These signals include signals which indicate crankshaft position, commonly called PIP (Profile Ignition Pickup) signals, which are typically applied to the microprocessor's interrupt terminal (not shown) to execute interrupt handling routines which perform time-critical operations under the control of variables stored in memory. By accumulating these interrupt signals, numerical values indicating of crankshaft rotation can be made available to the adaptive fuel control system. Analog signal values from sensors, including the temperature sensor 112, the pressure sensor 111, the HEGO sensor 115, and the load sensor(s) 117, may be delivered to the controller as a voltage level signals and converted to digital form for processing by means analog-to-digital (A-D) converters which are available as an integrated part of the microcontroller.

The adaptive correction table 170, because it is both read and updated, preferably takes the form of a non-volatile "keep alive memory" (KAM), whereas the battery voltage correction table 180 and the fuel supply correction table 190 consist of values determined empirically from a particular vehicle and permanently stored in a read only memory, along with other engine configuration parameters.

The operation of the P.I.D. controller 160 is conventional and provides the principle closed-loop control mechanism for establishing the fuel delivery rate from the injectors 114. The oxygen level signal 105 from the HEGO sensor is supplied to the P.I.D. controller 160 via a low-pass filter 161 which removes high-frequency components from the oxygen level signal. When the oxygen level signal supplied via filter 161 to the controller 160 falls below a predetermined level, indicating a rich condition, the controller's proportional component produces a stepwise decrease in the duration of the injector signal, and then begins to gradually and progressively decrease the command signal duration, thus gradually reducing the fuel delivered to the engine until the combustion products reaching the HEGO sensor produce a high oxygen level, indicating a lean condition, whereupon the controller abruptly increases the duration of the command signal and begins to gradually and progressively increase the command signal duration using its integral component, causing an increasing amount of fuel to be supplied until the HEGO sensor again detects a rich condition. These cycles continue such that the air/fuel mixture being is held at or near stoichiometry. Additional information of use of such closed-loop control mechanisms is presented by D. R. Hamburg and M. A. Schulman in SAE Paper 800826.

The first of the three correction tables, the adaptive value table seen at 170, is conventional and provides the fuel control system with the ability to adaptively learn (and thereafter predict) approximately what the fuel delivery rate should be to achieve stoichiometry at a given engine speed and load. When the engine has achieved a stable operation condition and the P.I.D. controller 160 has determined a rate of fuel delivery which is at or near stoichiometry, an adaptive logic unit 172 stores the fuel delivery rate (which takes the form of an injector command duration value) in the adaptive table 170. The adaptive table 170 enables acceptable fuel delivery rates to be adaptively learned and stored, and later fetched when engine operating conditions change abruptly, permitting the learned value to be used as a estimate which the P.I.D. controller can then refine to achieve stoichiometric operation more rapidly.

The battery voltage correction table 180, also conventional, senses the voltage level supplied from the voltage source 154 to operate the injectors, and corrects the duration of the command signal to compensate for the fact that the injectors response time is a predictable function of the injector operating potential. The correction value from table 180 takes the form of a duration value (which may be expressed in milliseconds) which directly adjusts the injector command signal to compensate for the effects of injector supply voltage variations.

The combination of the PID controller 160 and the adaptive and battery voltage lookup table functions have proven to function reliably and accurately for liquid fueled engines. However, when an attempt is made to supply the engine with fuel which takes the form of a compressed gas, the fuel control system does not provide consistently reliable operation. These problems have two principle causes: (1) the pressure regulator is typically unable to accurately control the pressure of the compressed gas supplied to the injector as the engine temperature and flow rates change and (2) the effects of temperature on the operating resistance of the injector actuators alters the response time of the injectors sufficiently to cause substantial changes in the fuel delivery rate of the compressed gas fuel. This problem may be corrected, and satisfactory operation achieved, by storing an additional set of correction values in a two-dimensional lookup table, indexed in one dimension by fuel pressure and in the other dimension by injector temperature. In practice, it has been found that a 5×5 table (indexed by five fuel pressure values and five injector temperature values) provides adequate accuracy and substantially improves the reliability of the fuel control system. This mechanism for compensating for the effects of temperature and pressure in a gaseous fuel injection system are is described in co-pending U.S. patent application Ser. No. 08/172,787 filed on Dec. 27, 1993 by Bela P. Povinger and Raymond L. Willey.

The pressure sensor 111 produces an output signal which is indicative of the instantaneous pressure within the fuel rail 13. In practice, it has been found that this instantaneous pressure varies significantly (up to 6 p.s.i.) as the fuel injector pulsations trigger perturbations in the supply pressure. The characteristics of these pressure fluctuations is a function of the physical design of the fuel rail, the design and set point of the fuel regulator, engine speed, engine load and other factors.

Improved performance can be realized, as contemplated by the present invention, by controlling fuel injection timing in a gaseous fuel injection system in accordance with the rolling average of sensed fuel rail pressure and by varying the time delay constant over which the rolling average is calculated in response to changes in engine speed and load.

As depicted in FIG. 1, the instantaneous fuel pressure value signal 101 from pressure sensor 111 is supplied to a mechanism 122 for calculating a rolling average based on a time delay period whose duration is controlled by the output value from a two-dimensional time constant lookup table 124. The value delivered by the time constant table 124 is determined by the current engine speed value 106 and the current engine load value 107.

The preferred method for producing a rolling average of the detected fuel pressure employs the same EEC microcontroller used to implement the electronic injector timing. The EEC's random access memory is employed to store digitally expressed variables, indicated in FIG. 2 by rounded rectangles, which are processed under stored program control. These variables comprise values representing instantaneous fuel pressure 201, engine speed (RPM) 206, engine load 107, average pressure 220, pressure deviation 221, and a time delay factor value 222.

Figure 2:
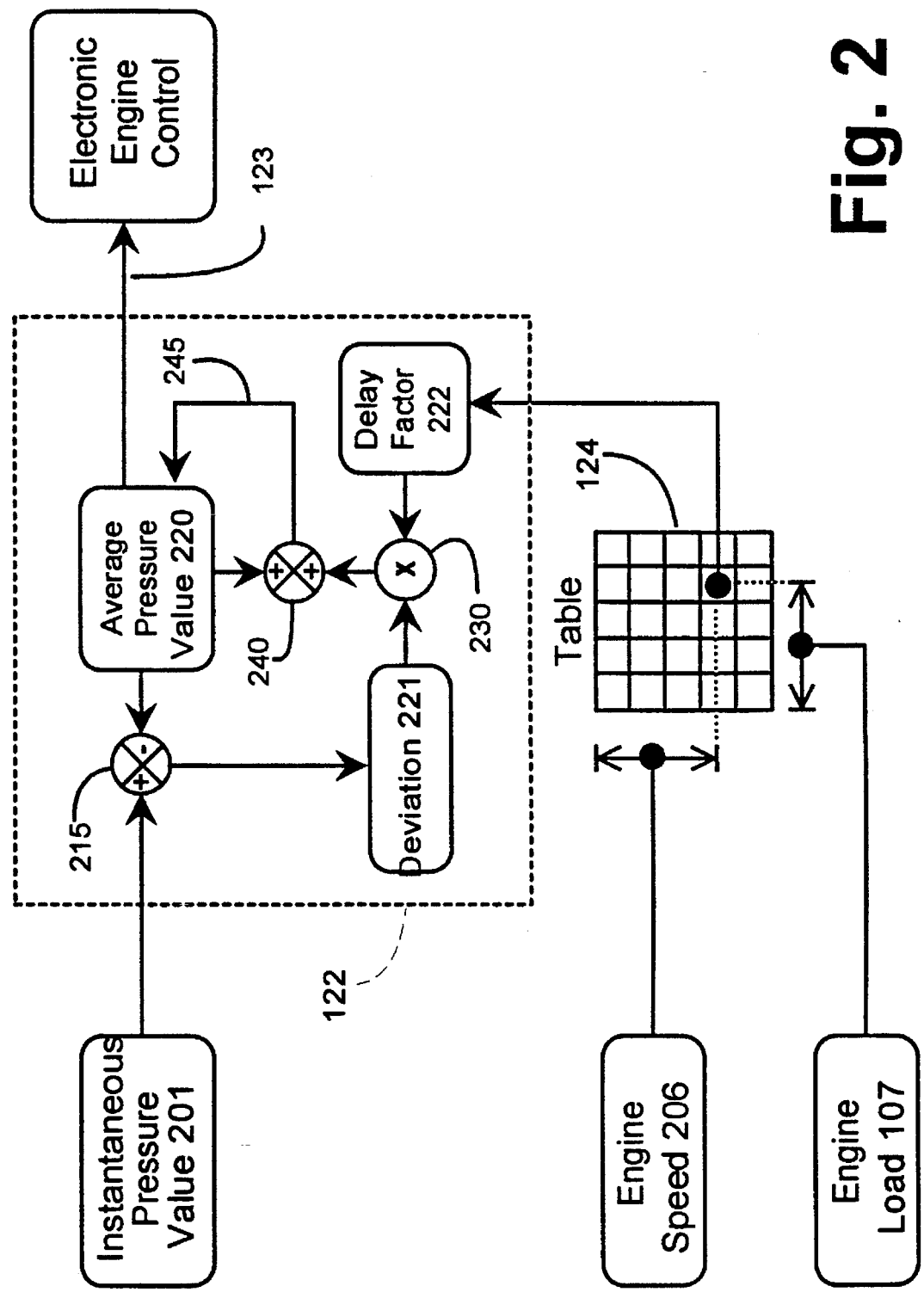
FIG. 2 is a functional data flow diagram illustrating the relationship of the various control signal values developed within the illustrative preferred embodiment of the invention.

The processing indicated in FIG. 2 takes place in repetitive cycles at cycle rate which is at least twice the highest frequency of the pressure perturbations detected by the pressure sensor in order to avoid aliasing errors from the sampling process. During each cycle, the instantaneous pressure value 201 from the sensor is compared, at 215, with the current average pressure value 220 to produce a signed deviation value 221. The deviation value 221 is then multiplied at 230 times a time delay factor 222 which selected from the table of time delay factor values 124 based upon the current engine speed value 206 and the engine load value 207. The product of the multiplication at 230 is a signed value which is added to the current average pressure value at 240 and the sum replaces the former average pressure value 220 as indicated at 245.

The arrangement shown in FIG. 2 is a difference equation implementation of a low pass filter where the difference equation which takes the form:

$$\text{New-Average} = \text{Old-Average} + (F * (\text{Current-Value} - \text{Old-Average}))$$

where the time delay factor F in the difference equation provides a discrete low pass filter having a time constant tc relative to the sampling period sp as specified by the relation:

$$F = 1 - e^{-(sp/tc)}$$

To insure that the average value 220 converges toward the current value 201 of the instantaneous pressure, when the value produced by multiplication 230 is less than the bit resolution of the average value 220, the average value is incremented or decremented by a single bit per cycle.

The value of the time delay factor 222 is obtained from the table 124 which is preferably implemented as a two dimensional, 5×5 array of values stored in the EEC read-only memory. These 25 stored values may be determined empirically for a given engine by testing, such that, for each given set of engine speed and engine load (or air mass flow rate) conditions, a time delay factor 222 is selected and stored in table 124 which is sufficiently small to reduce pressure perturbations to an acceptable level, but no smaller, to avoid introducing an undesirable time lag in the fuel control system's response to operating variations in fuel pressure.

It is to be understood that the specific mechanisms and techniques which have been described are merely illustrative of on application of the principles of the invention. Numerous modifications may be made to the methods and apparatus described without departing from the true spirit and scope of the invention.

What is claimed is:

1. The method of compensating for variations in the pressure at which a gaseous fuel is supplied to one or more fuel injectors in an internal combustion engine, said method comprising, in combination, the steps of:

supplying a timing signal to said fuel injectors for establishing variable duration intervals during which measured quantities of fuel are injected into said engine, providing an actual pressure signal indicative of the current magnitude of said pressure at which said gaseous fuel is supplied to said injectors, processing said actual pressure signal to derive therefrom a rolling average signal indicative of the average value of said actual pressure signal during a time delay duration, repetitiously adjusting said time delay duration in response to variations in an indicia of the operating condition of said engine, and varying the duration of said variable duration intervals in response to changes in said rolling average pressure signal value.

2. The method as set forth in claim 1 wherein said indicia of the operating condition of said engine includes an RPM signal indicative of rotational speed of said engine.

3. The method as set forth in claim 2 wherein said indicia further includes a load signal indicative of the mass flow rate of the air being supplied to said engine.

4. The method as set forth in claim 1 wherein said indicia of the operating condition of said engine includes a load signal indicative of the mass flow rate of the air being supplied to said engine.

5. The method as set forth in claim 1 wherein said step of repetitiously adjusting said time delay duration in response to variations in an indicia of the operating condition of said engine comprises, in combination, the steps of:

generating an RPM signal indicative of the rotational speed of said engine, generating a load signal indicative of the mass flow rate of intake combustion air being supplied to said engine, and generating said time delay factor as a predetermined function of the magnitude of said RPM signal and the magnitude of said load signal.

6. A method for controlling the fuel injectors of an internal combustion engine, said injectors being adapted to receive fuel under pressure via a fuel supply system and further being adapted to inject a measured amount of fuel into said engine in response to a command signal whose duration is indicative of the amount of fuel to be injected, said method comprising, in combination, the steps of:

measuring the oxygen content of the gases exhausted by said engine to form an oxygen level signal, varying the duration of said command signal in response to said oxygen level signal by increasing said duration whenever said oxygen level signal is greater than a first threshold value and decreasing said duration whenever said oxygen level is less than a second threshold value, measuring the pressure of said fuel in said fuel supply conduit to form a fuel pressure signal, forming an rolling average fuel pressure signal which is repeatedly modified by an amount representing a delay factor multiplied times the difference between said fuel pressure signal and said rolling average fuel pressure signal, repeatedly modifying said delay factor based on the measured current operating conditions of said engine, and varying the duration of said command signal in response to variations in said rolling average fuel pressure signal.

7. The method as set forth in claim 6 wherein said step of repeatedly modifying said delay factor comprises, in combination, the steps of:

measuring the mass flow rate of the air supplied to said internal combustion engine, and modifying said delay factor to maintain a first predetermined relationship between said delay factor and the current value of said mass flow rate.

8. The method as set forth in claim 7 wherein said step of repeatedly modifying said delay factor further comprises, in combination, the steps of:

measuring the rotational speed of said internal combustion engine, and modifying said delay factor to maintain a second predetermined relationship between said delay factor and the current value of said rotational speed.

* * * * *